US008195490B2

(12) United States Patent
Tambe et al.

(10) Patent No.: US 8,195,490 B2
(45) Date of Patent: Jun. 5, 2012

(54) AGENT SECURITY VIA APPROXIMATE SOLVERS

(75) Inventors: Milind Tambe, Rancho Palos Verdes, CA (US); Praveen Paruchuri, Pittsburgh, PA (US); Fernando Ordóñez, Van Nuys, CA (US); Sarit Kraus, Givat Shemuel (IL); Jonathan Pearce, New York, NY (US); Janusz Marecki, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 758 days.

(21) Appl. No.: 12/251,766

(22) Filed: Oct. 15, 2008

(65) Prior Publication Data

US 2009/0119239 A1     May 7, 2009

Related U.S. Application Data

(60) Provisional application No. 60/980,128, filed on Oct. 15, 2007, provisional application No. 60/980,739, filed on Oct. 17, 2007.

(51) Int. Cl.
*G06Q 10/00* (2006.01)
*G06G 7/48* (2006.01)
(52) U.S. Cl. .......................................... 705/7.11; 703/2
(58) Field of Classification Search ................. 705/7.11; 703/2
See application file for complete search history.

(56) References Cited

U.S. PATENT DOCUMENTS

| 6,731,998 | B2 * | 5/2004 | Walser et al. ................ 700/99 |
| 6,836,689 | B2 * | 12/2004 | Walser et al. ................ 700/100 |
| 7,315,801 | B1 * | 1/2008 | Dowd et al. .................. 703/13 |
| 2010/0114541 | A1 * | 5/2010 | Johnson ........................ 703/2 |

OTHER PUBLICATIONS

R Wolfler Calvo, & R Cordone. (2003). A heuristic approach to the overnight security service problem. Computers & Operations Research, 30(9), 1269-1287. Retrieved Jun. 18, 2011, from ABI/INFORM Global.*

Decentralized Stackelberg Strategies for Interconnected Stochastic Dynamic Systems by Glankwamdee, Suvalai Pratishthananda, Ph.D., University of Illinois at Urbana-Champaign, 1977, 102 pages; AAT 7804000.*

Chang, Tsu-Shuan. "On the Decomposition and Coordination of Large Scale Dynamic Control Problems." Proceedings on 24th Conference on Decision and Control. Ft. Lauderdale, FL, IEEE. 1985. 1484-1485.*

(Continued)

*Primary Examiner* — Beth V Boswell
*Assistant Examiner* — Folashade Anderson
(74) *Attorney, Agent, or Firm* — McDermott Will & Emery LLP

(57) ABSTRACT

Efficient heuristic methods are described for approximating the optimal leader strategy for security domains where threats come from unknown adversaries. These problems can be modeled as Bayes-Stackelberg games. An embodiment of the heuristic method can include defining a patrolling or security domain problem as a mixed-integer quadratic program. The mixed-integer quadratic program can be converted to a mixed-integer linear program. For a single follower (e.g., robber or terrorist) scenario, the mixed-integer linear program can be solved, subject to appropriate constraints. For embodiments applicable to multiple follower situations, the relevant mixed-integer quadratic program and related mixed-integer linear program can be decomposed, e.g., by changing the response function for the follower from a pure strategy to a weighted combination over various pure follower strategies where the weights are probabilities of occurrence of each of the follower types.

34 Claims, 5 Drawing Sheets

OTHER PUBLICATIONS

Brown, Gerald. Operations Research Center at MIT: presented at the INFORMS Annual Meeting, Nov. 13-16, 2005.*

Paruchuri, Praveen. "Efficient Algorithms to Solve Bayesian Stackelberg Games for Security Applications." Twenty-Third AAAI Conference on Artifical Intelligence. Association for the Advancement of Artificial Intelligence. 2008. 1559-1562.*

Paruchuri, Praveen. "Security in Multiagent Systems by Policy Randonmization." AAMAS'06 Hakodate, Hokkaido, Japan. (2006).*

Medanic, J. Multileve Stackelberg Strategies in Linear-Quadratic Systems. 23. Plemum Publishing Corporation, 1978. 485-497.*

Paruchuri, Praveen; Pearce, Jonathan and Kraus (unknown). Playing Games for Security: An Efficient Exact Algorithm for Solving Bayesian Stackelberg Games. University of Waterloo.*

Paruchuri, Praveen and Pearce, Jonathan. (2007). An Efficient Heuristic for Security Against Multiple Adversaries in Stackelberg Games. American Association for Artificial Intelligence.*

Conitizer et al. Computing the Optimal Strategy to Commit to, 7th ACM Conference on Electronic Commerce, 2006, 82-90.

Harsanyi et al, A Generalized Nash Solution for Two-Person Bargaining Games with Incomplete Information, Management Science, 1972, 18(5):80-106.

Sandholm et al. Mixed-Integer Programming Methods for Finding Nash Equilibria, AAAI, 2005, 495-501.

* cited by examiner

FIG. 2

202 — THE LEADER FOLLOWING A SOLUTION TO THE MIXED INTEGER QUADRATIC PROBLEM (MIQP)

$$\max \sum_{i \in N} \sum_{j \in Q} \frac{1}{k} R_{ij} q(x)_j x_i \quad \text{or} \quad \max \sum_{i \in N} \sum_{j \in Q} \frac{1}{k} R_{ij} x_i q_j$$

WITH OPTIMALITY CONDITIONS

204 — THE FOLLOWER RESPONDING TO THE LEADER STRATEGY BASED ON THE LINEAR PROGRAM WITH OPTIMALITY CONDITIONS, $$\max \sum_{j \in Q} \sum_{i \in N} \frac{1}{k} C_{ij} x_i q_j$$

206 — THE LEADER FOLLOWING A SOLUTION BASED ON THE MIXED-INTEGER LINEAR PROGRAM (MILP) WITH OPTIMALITY CONDITIONS, $$\max_{q,z} \sum_{i \in N} \sum_{j \in Q} \frac{1}{k} R_{ij} z_{ij}$$

208 — PERFORMING A DECOMPOSITION ON THE MILP TO ALLOW FOR MULTIPLE FOLLOWERS

210 — THE LEADER FOLLOWING A SOLUTION BASED IN THE MIXED-INTEGER LINEAR PROGRAM (MILP) WITH OPTIMALITY CONDITIONS, $$\max_{q,z} \sum_{i \in N} \sum_{j \in Q} \frac{1}{k} R_{ij} z_{ij}$$

AGENT SECURITY VIA APPROXIMATE SOLVERS

RELATED APPLICATIONS

This application claims priority to U.S. Provisional Patent Application Ser. No. 60/980,128, entitled "ASAP (Agent Security Via Approximate Policies) Algorithm in an Approximate Solver for Bayesian-Stackelberg Games" filed 15 Oct. 2007 and U.S. Provisional Patent Application Ser. No. 60/980,739, entitled "DOBSS (Decomposed Optimal Bayesian Stackelberg Solver) is an Optimal Algorithm for Solving Stackelberg Games" filed 17 Oct. 2007; the entire contents of both of which applications are incorporated herein by reference.

FEDERALLY SPONSORED RESEARCH OR DEVELOPMENT

This invention was made with government support by (i) the Defense Advanced Research Projects Agency (DARPA), through the Department of the Interior, NBC, Acquisition Services Division, under Contract No. NI3CHD0300I0, (ii) the Office of Naval Research, under contract No. N00014-05-1-0630, and (iii) the Department of Homeland Security, under contract No. 2007-ST-061-000001. The Government has certain rights in the invention.

BACKGROUND

In adversarial multiagent domains, security, commonly defined as the ability to deal with intentional threats from other agents, is a critical issue. These domains can be modeled as Bayesian games. Much work has been done on finding equilibria for such games. It is often the case, however, in multiagent security domains that one agent can commit to a mixed strategy that its adversaries observe before choosing their own strategies. In this case, the agent can maximize reward by finding an optimal strategy, without requiring equilibrium. Previous work has shown this problem of optimal strategy selection to be NP-hard.

In many multiagent domains, agents must act in order to provide security against attacks by adversaries. A common issue that agents face in such security domains is uncertainty about the adversaries they may be facing. For example, a security robot may need to make a choice about which areas to patrol, and how often. It will not, however, know in advance exactly where a robber will choose to strike. A team of unmanned aerial vehicles (UAVs) monitoring a region undergoing a humanitarian crisis may also need to choose a patrolling policy. They must make this decision without knowing in advance whether terrorists or other adversaries may be waiting to disrupt the mission at a given location. It may indeed be possible to model the motivations of types of adversaries the agent or agent team is likely to face in order to target these adversaries more closely. In both cases, the security robot or UAV team will not know exactly which kinds of adversaries may be active on any given day.

A common approach for choosing a policy for agents in such scenarios is, as described previously, to model the scenarios as Bayesian games. A Bayesian game is a game in which agents may belong to one or more types; the type of an agent determines its possible actions and payoffs. The distribution of adversary types that an agent will face may be known or inferred from historical data. Usually, these games are analyzed according to the solution concept of a Bayes-Nash equilibrium, an extension of the Nash equilibrium for Bayesian games. In many settings, however, a Nash or Bayes-Nash equilibrium is not an appropriate solution concept, since it assumes that the agents' strategies are chosen simultaneously.

In some settings, one player can commit to a strategy before the other players choose their strategies, and by doing so, attain a higher reward than if the strategies were chosen simultaneously. These scenarios are known as Stackelberg games. In a Stackelberg game, a leader commits to a strategy first, and then a follower (or group of followers) selfishly optimize their own rewards, considering the action chosen by the leader. For example, the security agent (leader) may first commit to a mixed strategy for patrolling various areas in order to be unpredictable to the robbers (followers). The robbers, after observing the pattern of patrols over time, can then choose their own strategy of choosing a location to rob.

To see the advantage of being the leader in a Stackelberg game, consider a simple game with the payoff table as shown in Table 1, infra. The leader is the row player and the follower is the column player. Here, the leader's payoff is listed first.

TABLE 1

Payoff table for example normal form game.

|   | 1    | 2    | 3     |
|---|------|------|-------|
| 1 | 5, 5 | 0, 0 | 3, 10 |
| 2 | 0, 0 | 2, 2 | 5, 0  |

The only Nash equilibrium for this game is when the leader plays 2 and the follower plays 2 which gives the leader a payoff of 2. However, if the leader commits to a uniform mixed strategy of playing 1 and 2 with equal (0.5) probability, the follower's best response is to play 3 to get an expected payoff of 5 (10 and 0 with equal probability). The leader's payoff would then be 4 (3 and 5 with equal probability). In this case, the leader now has an incentive to deviate and choose a pure strategy of 2 (to get a payoff of 5). However, this would cause the follower to deviate to strategy 2 as well, resulting in the Nash equilibrium. Thus, by committing to a strategy that is observed by the follower, and by avoiding the temptation to deviate, the leader manages to obtain a reward higher than that of the best Nash equilibrium.

The problem of choosing an optimal strategy for the leader to commit to in a Stackelberg game is analyzed in and found to be NP-hard in the case of a Bayesian game with multiple types of followers. Thus, efficient heuristic techniques for choosing high-reward strategies in these games is an important open issue. Methods for finding optimal leader strategies for non-Bayesian games can be applied to this problem by converting the Bayesian game into a normal-form game by the Harsanyi transformation. If, on the other hand, one wishes to compute the highest-reward Nash equilibrium, new methods using mixed-integer linear programs (MILPs) may be used, since the highest-reward Bayes-Nash equilibrium is equivalent to the corresponding Nash equilibrium in the transformed game. However, by transforming the game, the compact structure of the Bayesian game is lost. In addition, since the Nash equilibrium assumes a simultaneous choice of strategies, the advantages of being the leader are not considered.

A Bayesian game can be transformed into a normal-form game using the Harsanyi transformation. Once this is done, prior art linear-program (LP)-based methods for finding high-reward strategies for normal-form games can be used to find a strategy in the transformed game; this strategy can then be used for the Bayesian game. While prior art methods exist for finding Bayes-Nash equilibria directly, without the Harsanyi transformation, they find only a single equilibrium in the general case, which may not be of high reward.

In most security patrolling domains, the security agents (like UAVs or security robots) cannot feasibly patrol all areas all the time. Instead, they must choose a policy by which they patrol various routes at different times, taking into account factors such as the likelihood of crime in different areas, possible targets for crime, and the security agents' own resources (number of security agents, amount of available time, fuel, etc.). It is usually beneficial for this policy to be nondeterministic so that robbers cannot safely rob certain locations, knowing that they will be safe from the security agents. To demonstrate the utility of our algorithm, we use a simplified version of such a domain, expressed as a game.

The most basic version of such a scenario game consists of two players: the security agent (the leader) and the robber (the follower) in a world consisting of m houses, 1 ... m. The security agent's set of pure strategies consists of possible routes of d houses to patrol (in an order). The security agent can choose a mixed strategy so that the robber will be unsure of exactly where the security agent may patrol, but the robber will know the mixed strategy the security agent has chosen. For example, the robber can observe over time how often the security agent patrols each area. With this knowledge, the robber must choose a single house to rob. We assume that the robber generally takes a long time to rob a house. If the house chosen by the robber is not on the security agent's route, then the robber successfully robs the house. Otherwise, if it is on the security agent's route, then the earlier the house is on the route, the easier it is for the security agent to catch the robber before he finishes robbing it.

We model the payoffs for this game with the following variables:

$v_{l,x}$: value of the goods in house l to the security agent.

$v_{l,q}$: value of the goods in house l to the robber.

$c_x$: reward to the security agent of catching the robber.

$c_y$: cost to the robber of getting caught.

$p_l$: probability that the security agent can catch the robber at the lth house in the patrol ($p_l < p_{l'} \Leftrightarrow_{l'<l}$).

The security agent's set of possible pure strategies (patrol routes) is denoted by X and includes all d-tuples $i = <w_1, w_2, \ldots, w_d>$ with $w_1 \ldots w_d = 1 \ldots m$, where no two elements are equal (the agent is not allowed to return to the same house). The robber's set of possible pure strategies (e.g., houses to rob) is denoted by Q and includes all integers $j = 1 \ldots m$. The payoffs (security agent, robber) for pure strategies i, j are:

$-v_{l,x}, v_{l,q}$, for $j = l \notin i$.

$p_l c_x + (1-p_l)(-v_{l,x}), -p_l c_q + (1-p_l)(V_{l,q})$, for $j = l \in i$.

With this structure it is possible to model many different types of robbers who have differing motivations; for example, one robber may have a lower cost of getting caught than another, or may value the goods in the various houses differently. If the distribution of different robber types is known or inferred from historical data, then the game can be modeled as a Bayesian game [6].

Bayesian Games

A Bayesian game contains a set of N agents, and each agent n must be one of a given set of types $\theta_n$. For the case of a simplified patrolling domain, two agents are present, the security agent and the robber. $\Theta_1$ is the set of security agent types and $\theta_2$ is the set of robber types. Since there is only one type of security agent, $\Theta_1$ contains only one element. During the game, the robber knows its type but the security agent does not know the robber's type. For each agent (the security agent or the robber) n, there is a set of strategies $\sigma_n$ and a utility function $u_n: \theta_1 \times \theta_2 \times \sigma_1 \times \sigma_2 \rightarrow \Re$.

As referenced previously, a Bayesian game can be transformed into a normal-form game using the Harsanyi transformation, as described in J. C. Harsanyi and R. Selten, "A generalized Nash solution for two-person bargaining games with incomplete information," Management Science, 18(5): 80-106, 1972; the entire contents of which are incorporated herein by reference. Once this is done, linear-program (LP)-based methods for finding high-reward strategies for normal-form games can be used to find a strategy in the transformed game; this strategy can then be used for the Bayesian game. While methods exist for finding Bayes-Nash equilibria directly, without the Harsanyi transformation, they find only a single equilibrium in the general case, which may not be of high reward. Recent work has led to efficient mixed-integer linear program techniques to find the best Nash equilibrium for a given agent. These techniques, however, do require a normal-form game, and so to compare the policies given by embodiments of the presently disclosed ASAP method against the optimal policy, as well as against the highest-reward Nash equilibrium, these techniques can be applied to the Harsanyi-transformed matrix, as described infra.

Harsanyi Transformation

The first step in solving Bayesian games is to apply the Harsanyi transformation that converts the incomplete information game into a normal form game. Given that the Harsanyi transformation is a standard concept in game theory, it is described briefly through a simple example without introducing the mathematical formulations. An initial assumption is that there are two robber types a and b in the Bayesian game. Robber a will be active with probability $\alpha$, and robber b will be active with probability $1-\alpha$. The rules described under the heading "The Patrolling Domain," supra, can allow construction of simple payoff tables.

For example, one can assume that there are two houses in the world (1 and 2) and hence there are two patrol routes (pure strategies) for the agent: $\{1,2\}$ and $\{2,1\}$. The robber can rob either house 1 or house 2 and hence he has two strategies (denoted as $1_l$, $2_l$, for robber type 1). Since there are two types assumed (denoted as a and b), two payoff tables (shown in Table 2) can be constructed corresponding to the security agent playing a separate game with each of the two robber types with probabilities $\alpha$ and $1-\alpha$. First, consider robber type a. Borrowing the notation from the domain section, supra, the following values can be assigned to the variables: $v_{1,x} = v_{1,q} = 3/4$, $v_{2,x} = V_{2,q} = 1/4$, $c_x = 1/2$, $C_q = 1$, $p_1 = 1$, $p_2 = 1/2$. Using these values, a base payoff table can be constructed as the payoff for the game against robber type a. For example, if the security agent chooses route $\{1,2\}$ when robber a is active, and robber a chooses house 1, the robber receives a reward of −1 (for being caught) and the agent receives a reward of 0.5 for catching the robber. The payoffs for the game against robber type b are constructed using different values.

TABLE 2

Payoff Tables: Security Agent vs. Robbers a and b

|  | Security Agent | |
|---|---|---|
|  | {1, 2} | {2, 1} |
| Robber a | | |
| $1_a$ | −1, 0.5 | −0.375, 0.125 |
| $2_a$ | −0.125, −0.125 | −1, 0.5 |
| Robber b | | |
| $1_b$ | −0.9, 0.6 | −0.275, 0.225 |
| $2_b$ | −0.025, −0.25 | −0.9, 0.6 |

Using the Harsanyi technique involves introducing a chance node that determines the robber's type, thus transforming the security agent's incomplete information regarding the robber into imperfect information. The Bayesian equilibrium of the game is then precisely the Nash equilibrium of the imperfect information game. The transformed, normal-form game is shown in Table 3, below.

In the transformed game, the security agent is the column player, and the set of all robber types together is the row player. Suppose that robber type a robs house 1 and robber type b robs house 2, while the security agent chooses patrol {1,2}. Then, the security agent and the robber receive an expected payoff corresponding to their payoffs from the agent encountering robber a at house 1 with probability a and robber b at house 2 with probability 1-α.

Finding an Optimal Strategy

Although a Nash equilibrium is the standard solution concept for games in which agents choose strategies simultaneously, in our security domain, the security agent (the leader) can gain an advantage by committing to a mixed strategy in advance. Since the followers (the robbers) will know the leader's strategy, the optimal response for the followers will be a pure strategy. Given the common assumption, in the case where followers are indifferent, they will choose the strategy that benefits the leader, there must exist a guaranteed optimal strategy for the leader.

From the Bayesian game in Table 2, the Harsanyi transformed bimatrix is constructed in Table 3. The index sets of the security agent and robbers' pure strategies denoted as $X=\sigma_1^{\theta_2}=\sigma_1$, and $Q=\sigma_2^{\theta_2}$, respectively, with R and C as the corresponding payoff matrices. $R_{ij}$ is the reward of the security agent and $C_{ij}$ is the reward of the robbers when the security agent takes pure strategy i and the robbers take pure strategy j. A mixed strategy for the security agent is a probability distribution over its set of pure strategies and will be represented by a vector $x=(p_{x1}, p_{x2}, \ldots, p_{x|x|})$, where $p_{xi} \geq 0$ and $\Sigma p_{xi}=1$. Here, p is the probability that the security agent will choose its ith pure strategy.

TABLE 3

Harsanyi Transformed Payoff Table

| | {1, 2} | {2, 1} |
|---|---|---|
| {1a, 2a} | −1α − 0.9(1 − α), 0.5α + 0.6(1 − α) | −0.375α − 0.275(1 − α), 0.125α + 0.225(1 − α) |
| {1a, 2b} | 1α − 0.025(1 − α), 0.5α − 0.025(1 − α) | −0.375α − 0.9(1 − α), 0.125α + 0.6(1 − α) |
| {2a, 1b} | −0.125α − 0.9(1 − α), −0.125α + 0.6(1 − α) | −1α − 0.275(1 − α), 0.5α + 0.225(1 − α) |
| {2a, 2b} | −0.125α − 0.25(1 − α), −0.125α + 0.025(1 − α) | −1α − 0.9(1 − α), 0.5α + 0.6(1 − α) |

The optimal mixed strategy for the security agent can be found in time polynomial in the number of rows in the normal form game using the following linear program formulation from.

For every possible pure strategy j by the follower (the set of all robber types), $$\max \sum_{i \in X} p_{xi} R_{ij} \quad \text{(Eq. 1)}$$

$$\text{s.t.} \quad \forall j' \in Q_1 \sum_{i \in \sigma_1} p_{xi} C_{ij} \geq \sum_{i \in \sigma_1} p_{xi} C_{ij'}$$

$$\sum_{i \in \mathcal{R}} p_{xi} = 1$$

$$\forall_{i \in \mathcal{R}, p_{xi}} \rangle = 0$$

Then, for all feasible follower strategies j, choose the one that maximizes $$\sum_{i \in X} p_{xi} R_{ij}$$

the reward for the security agent (leader). The $p_{xi}$ variables give the optimal strategy for the security agent.

Note that while this method is polynomial in the number of rows in the transformed, normal-form game, the number of rows increases exponentially with the number of robber types. Using this method for a Bayesian game thus requires running $|\sigma_2|^{|\Theta_2|}$ separate linear programs. This is not a surprise, since finding the optimal strategy to commit to for the leader in a Bayesian game is NP-hard.

The patrolling problem has recently received growing attention from the multiagent community due to its wide range of applications. However most of this work is focused on either limiting energy consumption involved in patrolling or optimizing on criteria like the length of the path traveled, without reasoning about any explicit model of an adversary.

What is desirable, therefore, are devices and techniques that address such limitations described for the prior art.

SUMMARY

Embodiments of the present disclosure (which can be referred to as "Agent Security via Approximate Policies" or "ASAP") provide an efficient heuristic method for approximating the optimal leader strategy for security domains where threats come from unknown adversaries. These problems can be modeled as Bayes-Stackelberg games.

An embodiment of the ASAP method can include defining a patrolling or security domain problem as a mixed-integer quadratic program. The mixed-integer quadratic program can be converted to a mixed-integer linear program. For a single follower (e.g., robber or terrorist) scenario, the mixed-integer linear program can be solved, subject to appropriate constraints.

For ASAP embodiments applicable to multiple follower situations, the relevant mixed-integer quadratic program and related mixed-integer linear program can be decomposed, e.g., by changing the response function for the follower from a pure strategy to a weighted combination over various pure follower strategies where the weights are probabilities of occurrence of each of the follower types.

Embodiments of ASAP methods according to the present disclosure can provide three key advantages over prior art techniques. First, the ASAP method can directly search for an optimal strategy, rather than a Nash (or Bayes-Nash) equilibrium, thus allowing it to find high-reward non-equilibrium strategies like the one in the above example. Second, it generates policies with a support which can be expressed as a uniform distribution over a multiset of fixed size. This allows for policies that are simple to understand and represent, as well as a parameter (the size of the multiset) that controls the simplicity of the policy and can be tuned. Third, the method allows for a Bayes-Nash game to be expressed compactly without requiring conversion to a normal-form game, allowing for large speedups over existing Nash methods.

Embodiments of the present disclosure can be implemented in hardware, software, firmware, or any combinations of such, and over one or more networks.

Other features and advantages of the present disclosure will be understood upon reading and understanding the detailed description of exemplary embodiments, described herein, in conjunction with reference to the drawings.

BRIEF DESCRIPTION OF DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 2 depicts a block diagram of a method in accordance with exemplary embodiments of the present disclosure;

Figure 1:
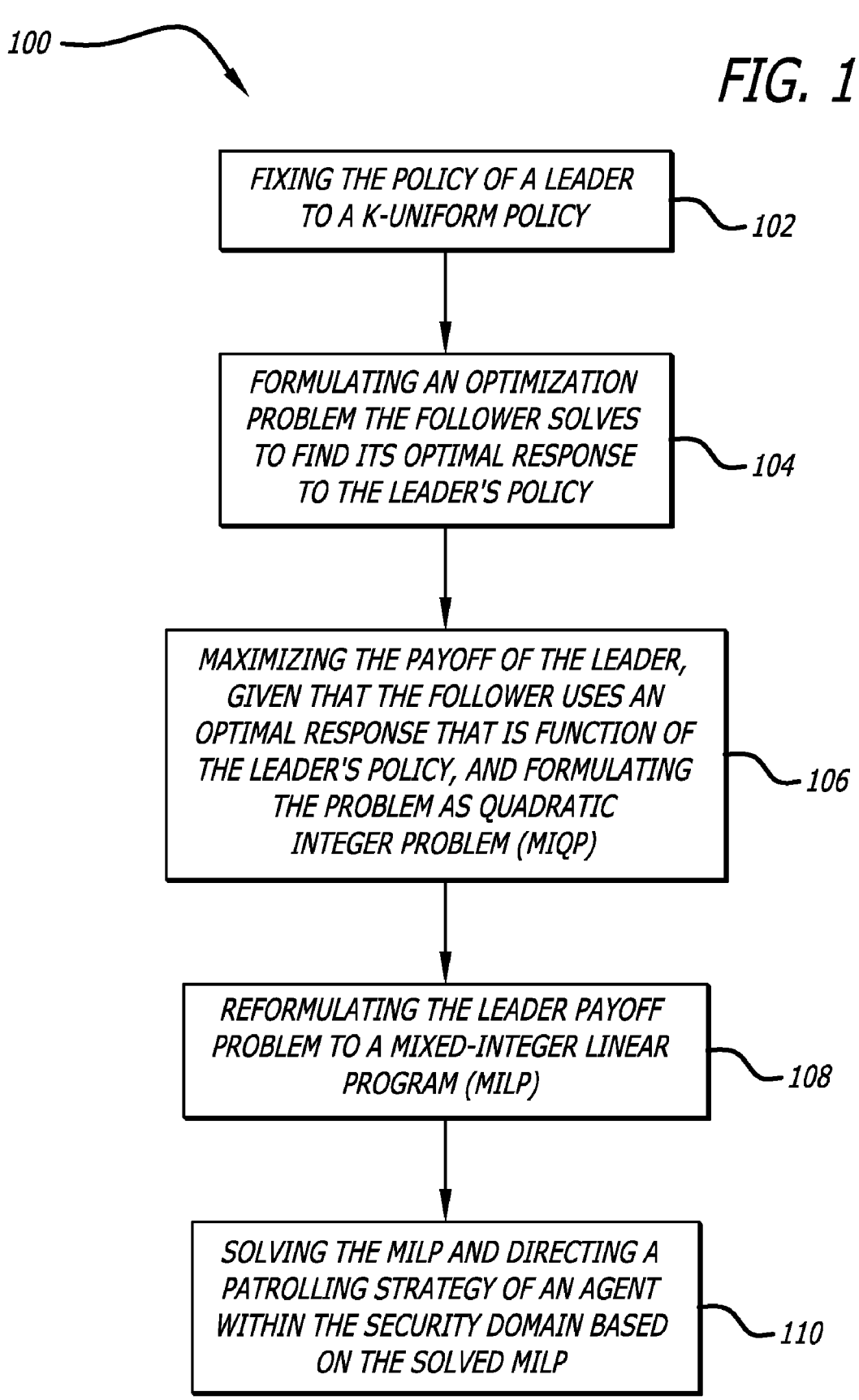
FIG. 1 depicts a block diagram of a method in accordance with exemplary embodiments of the present disclosure.

While certain embodiments depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

In adversarial multiagent domains, security, commonly defined as the ability to deal with intentional threats from other agents, is a critical issue. Given that finding the optimal strategy for the leader in the previously described patrolling domain modeled as a Bayes-Stackelberg game is NP-hard, embodiments of the present disclosure provide a heuristic approach for finding the optimal strategy of the leader in such situations.

In embodiments of this heuristic method (or algorithm), the possible mixed strategies of the leader can be limited to select actions with probabilities that are integer multiples of $1/k$ for a predetermined integer k. Strategies with high entropy can be beneficial for security applications when opponents' utilities are completely unknown. In embodiments of the modeled patrolling domain, if utilities are not considered, this method will result in uniform-distribution strategies. One advantage of such strategies is that they are compact to represent (as fractions) and simple to understand; therefore such strategies can be efficiently implemented by real organizations.

The advantage provided by simple strategies can be maintained for security application problem addressed by the ASAP methods, incorporating the effect of the robbers' rewards on the security agent's rewards. Thus, embodiments of the ASAP heuristic method can produce strategies which are k-uniform. A mixed strategy is denoted k-uniform if it is a uniform distribution on a multiset S of pure strategies with $|S|=k$. A multiset is a set whose elements may be repeated multiple times; thus, for example, the mixed strategy corresponding to the multiset $\{1, 1, 2\}$ would take strategy 1 with probability $2/3$ and strategy 2 with probability $1/3$. Embodiments of the ASAP method allow the size of the multiset to be chosen in order to balance the complexity of the strategy reached with the goal that the identified strategy will yield a high reward.

Another advantage of the ASAP heuristic method is that it operates directly on the compact Bayesian representation, without requiring the Harsanyi transformation. This is because the different follower (robber) types are independent of each other. Hence, evaluating the leader strategy against a Harsanyi-transformed game matrix is equivalent to evaluating against each of the game matrices for the individual follower types. This independence property is exploited in ASAP methods to yield a decomposition scheme. Note that prior art LP methods introduced to compute optimal Stackelberg policies are unlikely to be decomposable into a small number of games as such have been shown to be NP-hard for Bayes-Nash problems. Finally, note that ASAP requires the solution of only one optimization problem, rather than solving a series of problems as in prior art LP methods.

For a single follower type, embodiments of the ASAP algorithm work as follows. Given a particular k, for each possible mixed strategy x for the leader that corresponds to a multiset of size k, evaluate the leader's payoff from x when the follower plays a reward-maximizing pure strategy. The mixed strategy with the highest payoff is then chosen/taken.

In such ASAP algorithms, one need only consider the reward-maximizing pure strategies of the followers (e.g., robbers or terrorists), since for a given fixed strategy x of the security agent, each robber type faces a problem with fixed linear rewards. If a mixed strategy is optimal for the robber, then so are all the pure strategies in the support of that mixed strategy. Note also that because the leader's strategies are limited to take on discrete values, an assumption that the followers will break ties in the leader's favor is not significant, since ties will be unlikely to arise. This is because, in domains where rewards are drawn from any random distribution, the probability of a follower having more than one pure optimal response to a given leader strategy approaches zero, and the leader will have only a finite number of possible mixed strategies.

The ASAP approach to characterize the optimal strategy for the security agent makes use of properties of linear programming. A briefly outline of these results are presented here for completeness.

Every linear programming problem, such as:

$$\max c^T x | Ax=b, x \geq 0,$$

has an associated dual linear program, in this case:

$$\min b^T y | A^T y \geq c.$$

These primal/dual pairs of problems satisfy weak duality: for any x and y primal and dual feasible solutions respectively, $c^T x \leq b^T y$. Thus a pair of feasible solutions is optimal if $c^T x = b^T y$, and the problems are said to satisfy strong duality. In fact if a linear program is feasible and has a bounded optimal solution, then the dual is also feasible and there is a pair $x^*$, $y^*$ that satisfies $c^T x^* = b^T y^*$. These optimal solutions are characterized with the following optimality conditions:

primal feasibility: $Ax=b$, $x \geq 0$ dual feasibility: $A^T y \geq c$ complementary slackness: $x_i(A^T y - c)_i = 0$ for all i.

Note that this last condition implies that $C^T x = x^T A^T y = b^T$, which proves optimality for primal dual feasible solutions x and y.

In the following subsections, the patrolling domain is first defined as a problem in its most intuitive form as a mixed-integer quadratic program. It is then shown how this problem can be converted into a mixed-integer linear program.

Mixed-Integer Quadratic Program ("MILO")

The case of a single type of follower can be examined first. Let the leader be the row player and the follower the column player. The vector of strategies of the leader can be denoted by x and q can denote the vector of strategies of the follower. X and Q can denote the index sets of the leader and follower's pure strategies, respectively. The payoff matrices R and C correspond to: $R_{ij}$ is the reward of the leader and $C_{ij}$ is the reward of the follower when the leader takes pure strategy i and the follower takes pure strategy j. Let k be the size of the multiset.

First the policy of the leader can be fixed to some k-uniform policy x. The value $x_i$ is the number of times pure strategy i is used in the k-uniform policy, which is selected with probability $x_i/k$. The optimization problem the follower solves to find its optimal response to x can be formulated as the following linear quadratic program:

$$\max \sum_{j \in Q} \sum_{i \in \mathbb{N}} \frac{1}{k} C_{ij} x_i q_j \quad \text{(Eq. 2)}$$
$$\text{s.t.} \sum_{j \in Q} q_j = 1$$
$$q \geq 0.$$

The objective function maximizes the follower's expected reward given x, while the constraints make feasible any mixed strategy q for the follower. The dual to this linear programming problem is the following:

$$\min \quad a \quad \text{(Eq. 3)}$$
$$\text{s.t.} \quad a \geq \sum_{i \in \mathbb{N}} \frac{1}{k} C_{ij} x_i, j \in Q.$$

From strong duality and complementary slackness, the maximum reward value that can be obtained for the follower a is the value of every pure strategy with $q_j > 0$ that is in the support of the optimal mixed strategy. Therefore each of these pure strategies is optimal. Optimal solutions to the follower's problem are characterized by linear programming optimality conditions: primal feasibility constraints in (Eq. 2), dual feasibility constraints in (Eq. 3), and complementary slackness:

$$q_j \left( a - \sum_{i \in \mathbb{N}} \frac{1}{k} C_{ij} \right) x_i = 0, j \in Q.$$

These conditions are be included in the problem solved by the leader in order to consider only best responses by the follower to the k-uniform policy x.

The leader seeks the k-uniform solution x that maximizes its own payoff, given that the follower uses an optimal response q(x). Therefore the leader solves the following integer problem:

$$\max \sum_{i \in \mathbb{N}} \sum_{j \in Q} \frac{1}{k} R_{ij} q(x)_j x_i \quad \text{(Eq. 4)}$$
$$\text{s.t.} \sum_{i \in \mathbb{N}} x_i = k$$
$$x_i \in \{0, 1, \ldots, k\},$$

Eq. 4 maximizes the leader's reward with the follower's best response (q for fixed leader's policy x and hence denoted $q(x)_j$) by selecting a uniform policy from a multiset of constant size k.

This problem can be completed by including the characterization of q(x) through linear programming optimality conditions. To simplify writing the complementary slackness conditions, q(x) is constrained to be only optimal pure strategies by just considering integer solutions of q(x). The leader's problem becomes:

$$\max_{x,q} \sum_{i \in \mathbb{N}} \sum_{j \in Q} \frac{1}{k} R_{ij} x_i q_j \quad \text{(Eq. 5)}$$
$$\text{s.t.} \sum_i x_i = k$$
$$\sum_{i \in Q} q_j = 1$$
$$0 \leq \left( a - \sum_{i \in \mathbb{N}} \frac{1}{k} C_{ij} x_i \right) \leq (1 - q_j) M$$
$$x_i \in \{0, 1, \ldots, k\}$$
$$q_i \in \{0, 1\}.$$

Here, the constant M is some large number. The first and fourth constraints enforce a k-uniform policy for the leader, and the second and fifth constraints enforce a feasible pure strategy for the follower. The third constraint enforces dual feasibility of the follower's problem (leftmost inequality) and the complementary slackness constraint for an optimal pure strategy q for the follower (rightmost inequality). In fact, since only one pure strategy can be selected by the follower, say $q_h = 1$, this last constraint enforces that $$a = \sum_{i \in \mathbb{N}} \frac{1}{k} C_{ih} x_i$$

imposing no additional constraint for all other pure strategies which have $q_j = 0$.

It can be noted that Eq. 5 is an integer program with a non-convex quadratic objective in general, as the matrix R need not be positive-semi-definite. Efficient solution methods for non-linear, non-convex integer problems remains a challenging research question. The ASAP methods can utilize a reformulation of this problem as a linear integer programming problem, for which a number of efficient commercial solvers exist.

Mixed-Integer Linear Program ("MILP")

We can linearize the quadratic program of Problem 5 through the change of variables $Z_{ij}=x_i q_j$, obtaining the following problem:

$$\max_{q,z} \sum_{i \in \aleph} \sum_{j \in Q} \frac{1}{k} R_{ij} z_{ij} \quad \text{(Eq. 6)}$$

$$\text{s.t.} \quad \sum_{i \in \aleph} \sum_{j \in Q} z_{ij} = k$$

$$\sum_{j \in Q} z_{ij} \leq k$$

$$hq_j \leq \sum_{i \in \aleph} z_{ij} \leq k$$

$$\sum_{j \in Q} q_j = 1$$

$$0 \leq \left(a - \sum_{i \in \aleph} \frac{1}{k} C_{ij} \left(\sum_{h \in Q} z_{ih}\right)\right) \leq (1-q_j)M$$

$$z_{ij} \in \{0, 1, \ldots, k\}$$

$$q_j \in \{0, 1\}.$$

Proposition 1: Equations 5 and 6 are equivalent.

Proof: Consider x, q a feasible solution of (Eq. 5). It can be shown that q, $z_{ij}=x_i q_j$ is a feasible solution of (Eq. 6) of same objective function value. The equivalence of the objective functions, and constraints 4, 6 and 7 of (Eq. 6) are satisfied by construction. The fact that $$\sum_{j \in Q} z_{ij} = x_i;$$

as $$\sum_{j \in Q} q_j = 1$$

explains constraints 1, 2, and 5 of (Eq. 6). Constraint 3 of (6) is satisfied because $$\sum_{i \in \aleph} z_{ij} \leq kq_j.$$

Now considering q, z feasible for Eq. 6, it can be shown that q and $$x_i = \sum_{j \in Q} z_{ij}$$

are feasible for Eq. 5 with the same objective value. In fact all constraints of Eq. 5 are readily satisfied by construction. To see that the objectives match, notice that if $q_h=1$ then the third constraint in Eq. 6 implies that $$\sum_{i \in \aleph} z_{ih} \leq k,$$

which means that $z_{ij}=0$ for all $i \in \aleph$ and all $j \neq h$. Therefore, $$x_i q_j = \sum_{l \in Q} z_{il} q_j = z_{ih} q_j = z_{ij}.$$

This last equality is because both are 0 when $j \neq h$. This shows that the transformation preserves the objective function value, completing the proof.

Given this transformation to a mixed-integer linear program (MILP), it can now be shown how embodiments of the ASAP method of the present disclosure can utilize/apply a decomposition technique on the MILP to obtain significant speedups for Bayesian games with multiple follower types.

Decomposition for Multiple Adversaries

The MILP (Eq. 6) developed supra handles only one follower. Since a security scenario can contain multiple follower (robber) types, the response function for the follower can be changed from a pure strategy into a weighted combination over various pure follower strategies where the weights are probabilities of occurrence of each of the follower types.

Decomposed MIQP. To admit multiple adversaries in the ASAP methods, the notation defined in the previous section can be modified to reason about multiple follower types. The vector of strategies of the leader can be denoted as x and $q^l$ the can denote the vector of strategies of follower l, with L denoting the index set of follower types. X and Q can denote the index sets of leader and follower l's pure strategies, respectively. The payoff matrices can be indexed on each follower l, considering the matrices $R^l$ and $C^l$.

Using this modified notation, the optimal solution of follower l's problem can be characterized, given the leaders k-uniform policy x, with the following optimality conditions:

$$\sum_{j \in Q} q_j^l = 1$$

$$a^l - \sum_{i \in \aleph} \frac{1}{k} C_{ij}^l x_i \geq 0$$

$$q_j^l \left( a^l - \sum_{i \in \aleph} \frac{1}{k} C_{ij}^l x_i \right) = 0$$

$$q_j^l \geq 0$$

Again, considering only optimal pure strategies for follower l's problem, the complementarity constraint above can be linearized. These constraints can be incorporated on the leader's problem that selects the optimal k-uniform policy. Therefore, given a priori probabilities $p^l$, with $l \in L$ of facing each follower, the leader solves the following problem:

$$\max_{x,q} \sum_{i \in \aleph} \sum_{l \in L} \sum_{j \in Q} \frac{p^l}{k} R_{ij}^l x_i q_j^l \quad \text{(Eq. 7)}$$

$$\text{s.t.} \quad \sum_i x_i = k$$

$$\sum_{j \in Q} q_j^l = 1$$

-continued $$0 \le \left(a^l - \sum_{i \in \mathbb{N}} \frac{1}{k} C_{ij}^l x_i\right) \le (1 - q_j^l)M$$

$$x_i \in \{0, 1, \ldots, k\}$$

$$q_j^l \in \{0, 1\}.$$

Eq. 7 for a Bayesian game with multiple follower types is indeed equivalent to Eq. 5 on the payoff matrix obtained from the Harsanyi transformation of the game. In fact, every pure strategy j in Eq. 5 corresponds to a sequence of pure strategies $j_l$, one for each follower $l \in L$. This means that $q_j = 1$ if and only if $q_{jl}^l = 1$ for all $l \in L$. In addition, given the a priori probabilities $p^l$ of facing player l, the reward in the Harsanyi transformation payoff table is $$R_{ij} = \sum_{l \in L} p^l R_{ijl}^l.$$

The same relation holds between C and $C^l$. These relations between a pure strategy in the equivalent normal form game and pure strategies in the individual games with each followers are key in showing these problems are equivalent.

Decomposed MILP

The quadratic programming problem of Eq. 7 can be linearized through the change of variables $z_{ij}^l = x_i q_j^l$, obtaining the following problem:

$$\max_{q,z} \sum_{i \in \mathbb{N}} \sum_{l \in L} \sum_{j \in Q} \frac{p^l}{k} R_{ij}^l z_{ij}^j \quad \text{(Eq. 8)}$$

s.t. $\sum_{i \in \mathbb{N}} \sum_{j \in Q} z_{ij}^l = k$ $\sum_{j \in Q} z_{ij}^l \le k$ $\sum_{j \in Q} q_j^l = 1$ $0 \le \left(a^l - \sum_{i \in \mathbb{N}} \frac{1}{k} C_{ij}^l x_i \left(\sum_{h \in Q} z_{ih}^l\right)\right) \le (1 - q_j^l)M$ $\sum_{i \in Q} z_{ij}^l = \sum_{j \in Q} z_{ij}^l$ $z_{ij}^l \in \{0, 1, \ldots, k\}$ $q_j^l \in \{0, 1\}.$ Proposition 2: Eq. 7 and Eq. 8 are equivalent.

Proof: Consider x, $q^l$, $a^l$ at with $l \in L$ a feasible solution of Eq. 7. It can be shown that $q^l$, $a^l$, $z_{ij}^l = x_i q_j^l$ is a feasible solution of Eq. 8 of same objective function value. The equivalence of the objective functions, and constraints 4, 7 and 8 of Eq. 8 are satisfied by construction. The fact that $$\sum_{j \in Q} z_{ij}^l = x_i;$$

as $$\sum_{j \in Q} q_j^l = 1$$

explains constraints 1, 2, 5 and 6 of Eq. 8. Constraint 3 of Eq. 8 is satisfied because $$\sum_{i \in \mathbb{N}} z_{ij}^l = k q_j^l,$$

Now it can be considered that $q^l$, $z^l$, and $a^l$ are feasible for Eq. 8. It can be shown that $q^l$, $a^l$, and $$x_i = \sum_{j \in Q} z_{ij}^l$$

are feasible for Eq. 7 with the same objective value. In fact all constraints of Eq. 7 are readily satisfied by construction. To see that the objectives match, it can be noticed that for each l, one $q_j^l$ must equal 1 and the rest equal 0. For example, if $q_{jl}^l = 1$, then the third constraint in Eq. 8 implies that $$\sum_{i \in \mathbb{N}} z_{ijl}^l = k,$$

which means that $Z_{ij}^l = 0$ for all $i \in \mathbb{N}$ and all $j \ne j_l$. In particular this implies that $$x_i = \sum_{j \in Q} z_{ij}^1 = z_{ijl}^1 = z_{ijl}^l,$$

the last equality from constraint 6 of Eq. 8. Therefore $x_i q_j^l = Z_{ijl}^l q_j^l = z_{ij}^l$. This last equality is because both are 0 when $j \ne j_l$. Effectively, constraint 6 ensures that all the adversaries are calculating their best responses against a particular fixed policy of the agent. This shows that the transformation preserves the objective function value, completing the proof.

Figure 3:
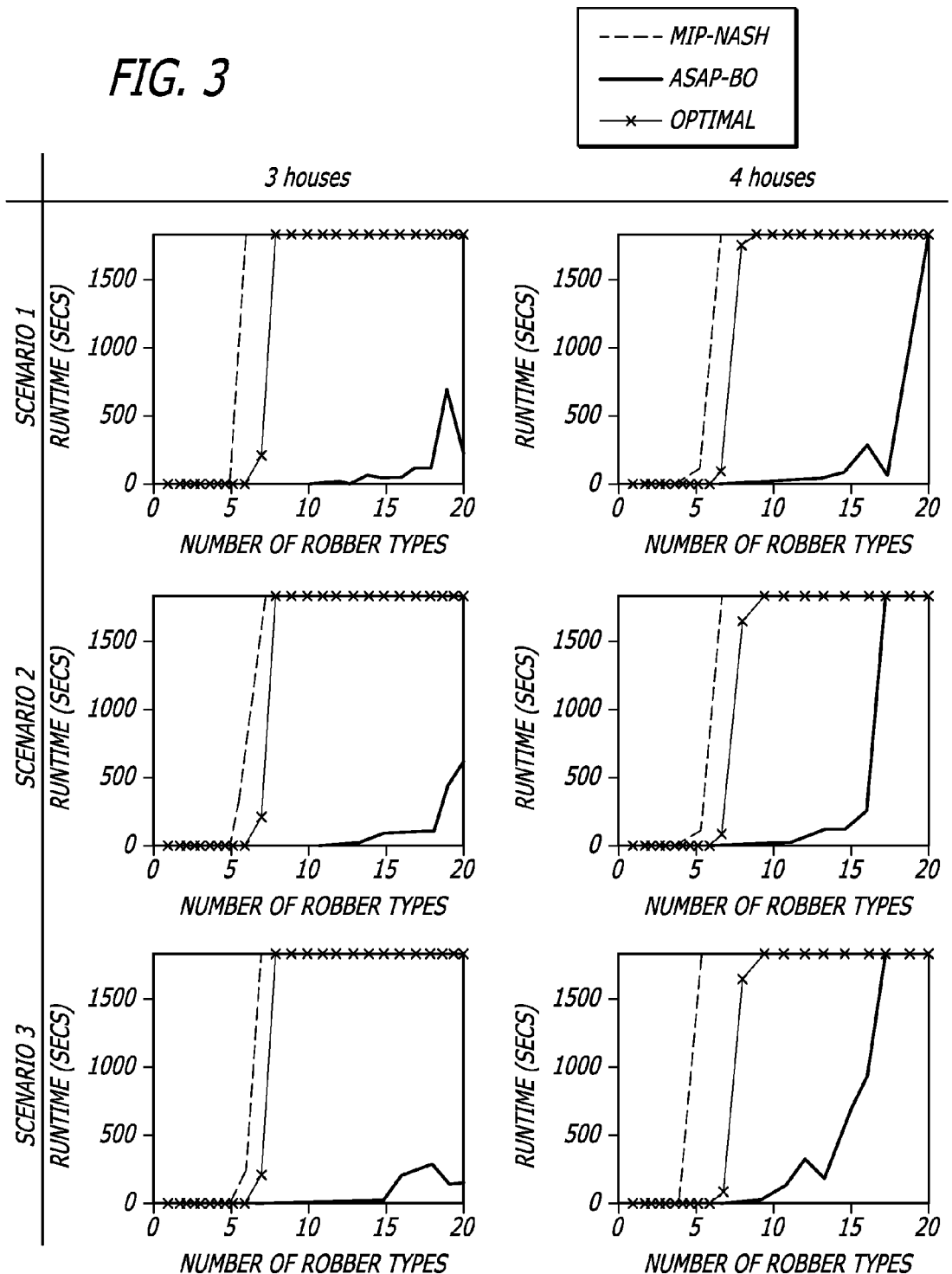
FIG. 3 depicts plots of software results for different scenarios showing calculated runtime vs. number of robber types for an embodiment of the present disclosure compared to software running prior art algorithms.
Figure 4:
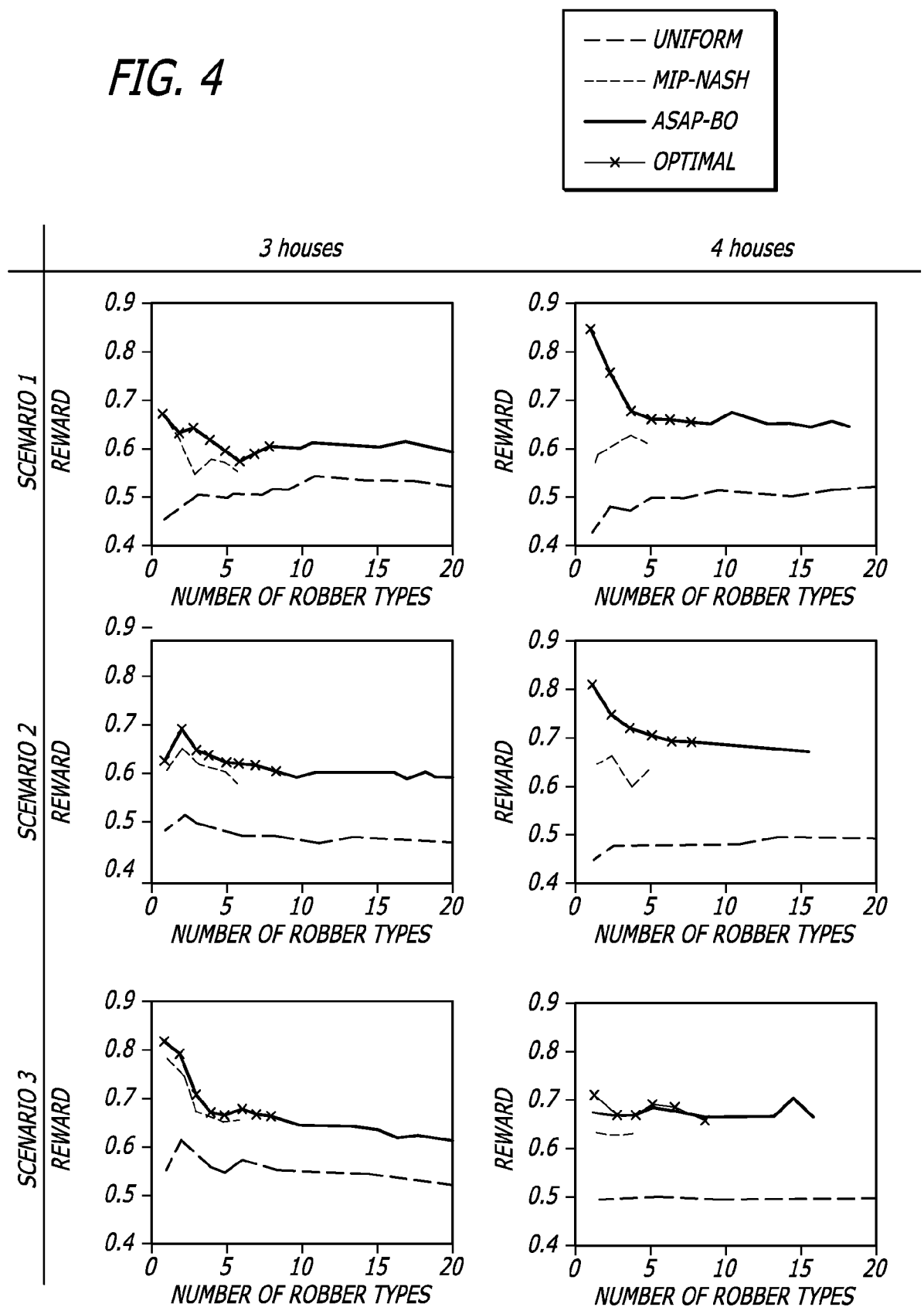
FIG. 4 depicts plots of software results for different scenarios showing runtime vs. number of robber types for an embodiment of the present disclosure compared to software running prior art algorithms.
Figure 5:
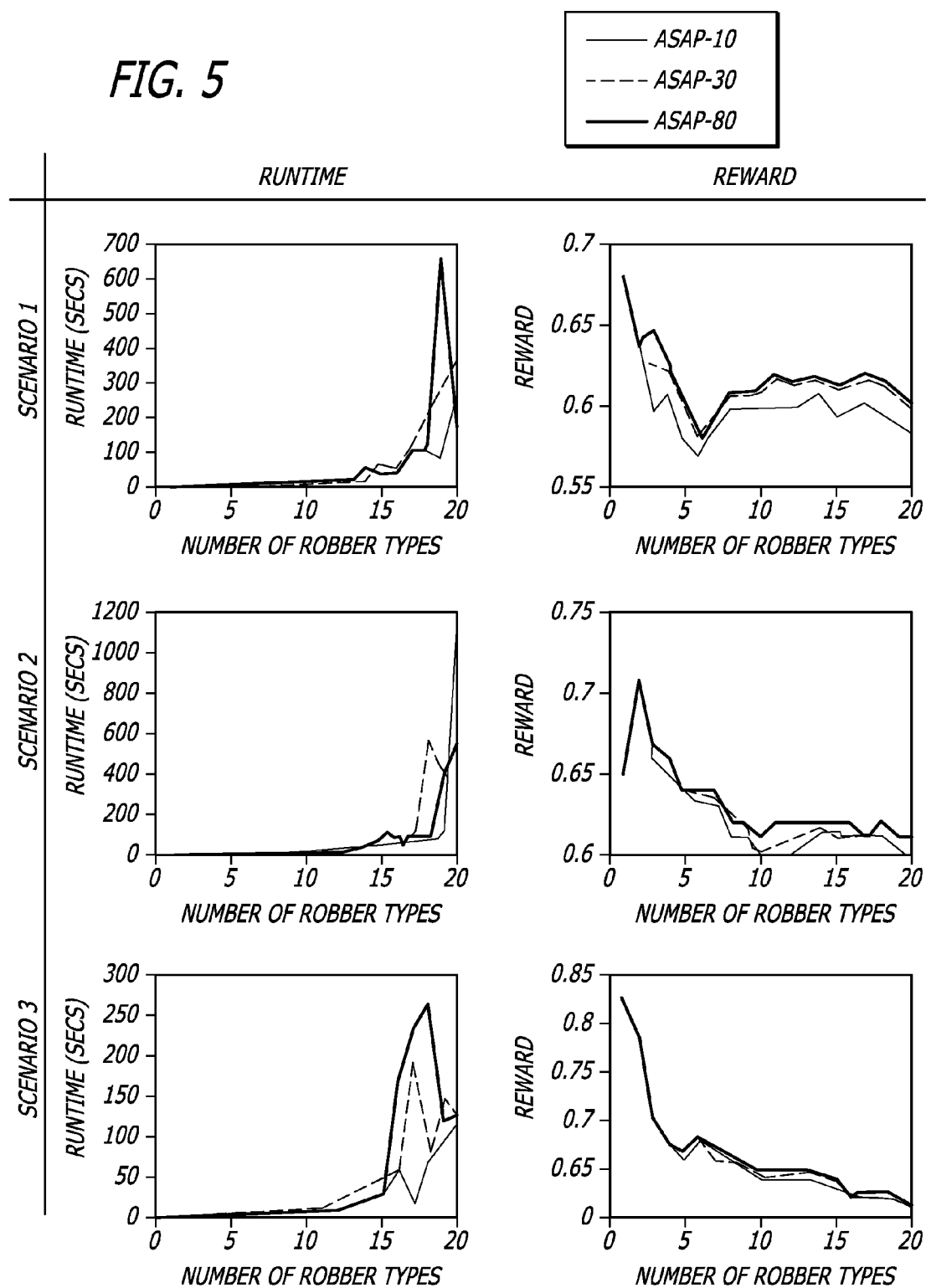
FIG. 5 depicts plots of software results for different scenarios showing calculated runtime vs. different multisets with specified numbers of elements, in accordance with exemplary embodiments of the present disclosure.

This equivalent linear integer program can therefore be solved with efficient integer programming packages which can handle problems with thousands of integer variables. The decomposed MILP was implemented in software and run on a suitable computer (with sufficient processing capability); the results of which are depicted in FIGS. 3-5 herein.

With the foregoing equations in mind, a basic embodiment of an ASAP method (algorithm) is depicted in FIG. 1. As shown, ASAP method 100 can include fixing the policy of a leader to a k-uniform policy, as described at 102. An optimization problem can be formulated that the follower solves to find its optimal response to the leader's policy, as described at 104. Maximizing the payoff of the leader can take place, given that the follower uses an optimal response that is function of the leader's policy, and the problem can be formulated as quadratic integer problem (MILQ), as described at 106.

Continuing with the description of method 100, the leader payoff problem can be reformulated to a mixed-integer linear program (MILP), as described at 108. The MILP can then be solved, as described at 110, e.g., with commercial mathematical analysis software such as CPLEX 8.1 (described in further detail, infra). Based on the solution to the MILP, a patrolling strategy (e.g., course over time) of an agent within the patrolling domain can be directed to or calculated for the agent.

Embodiments of the present disclosure can be implemented in hardware, software, firmware, or any combinations of such, and over one or more networks. Suitable hardware can include one or more computer systems (with attendant hardware) or processors configured and arranged to implement ASAP methods/algorithms described herein.

FIG. 2 depicts a further example of a more detailed ASAP method (algorithm) 200 in accordance with exemplary embodiments of the present disclosure. The leader can follow the mixed integer quadratic problem (MIQP) of the form max $$\sum_{i \in N} \sum_{j \in Q} \frac{1}{k} R_{ij} q(x)_j x_i \text{ or } \max \sum_{i \in N} \sum_{j \in Q} \frac{1}{k} R_{ij} x_i q_j$$

with optimality conditions described supra, as described at 202. The follower can respond to the leader's policy by solving an optimization problem of the form $$\max \sum_{j \in Q} \sum_{i \in N} \frac{1}{k} C_{ij} x_i q_j$$

with optimality conditions described supra, as described at 204. The leader can follow a solution based on the mixed-integer linear program (MILP) of the form max $$\sum_{i \in N} \sum_{j \in Q} \frac{1}{k} R_{ij} z_{ij}$$

with optimality conditions described supra, as described at 206.

Continuing with the description of method 200, a decomposition can optionally be performed on the formulated MILP (or MILQ) for the patrolling domain to allow for multiple followers (e.g., robbers), as described at 208. Finally, the leader can follow a solution based in the mixed-integer linear program (MILP), such as one of the form max $$\sum_{i \in N} \sum_{j \in Q} \frac{1}{k} R_{ij} z_{ij}$$

with optimality conditions described supra, as described at 210.

Experimental Results

FIGS. 3-5 depicts results obtained by running software implementing an embodiment of the ASAP algorithm/method. FIG. 3 depicts plots of software results for different scenarios showing calculated runtime vs. number of robber types for an embodiment of the present disclosure compared to software running prior art algorithms. FIG. 4 depicts plots of software results for different scenarios showing runtime vs. number of robber types for an embodiment of the present disclosure compared to software running prior art algorithms. And finally, FIG. 5 depicts plots of software results for different scenarios showing calculated runtime vs. different multisets with specified numbers of elements, in accordance with exemplary embodiments of the present disclosure.

Experiments were performed for this game in worlds of three and four houses with patrols consisting of two houses. (The patrolling domain and the payoffs for the associated game are detailed above.) The description given previously was used to generate a base case for both the security agent and robber payoff functions. The payoff tables for additional robber types were constructed and added to the game by adding a random distribution of varying size to the payoffs in the base case. All games were normalized so that, for each robber type, the minimum and maximum payoffs to the security agent and robber are 0 and 1, respectively.

Using the data generated, experiments were performed using four methods for generating the security agent's strategy:

(1) uniform randomization;
(2) an embodiment of the ASAP method/algorithm;
(3) a prior art multiple linear program method (V. Conitizer and T. Sandholm, "Choosing the best strategy to commit to," in *ACM Conference on Electronic Commerce*, 2006; the entire contents of which are incorporated herein by reference) to find the true optimal strategy; and
(4) the highest reward Bayes-Nash equilibrium, found using the MIP-Nash algorithm (as described in S. Singh, et al., "Mixed-integer programming methods for finding Nash equilibria," in *AAAI*, 2005; the entire contents of which are incorporated herein by reference).

The last three methods were applied using CPLEX 8.1 (ILOG® CPLEX® mathematical optimization technology software as made commercially available by ILOG, Inc. having a place of business at 9, rue de Verdun, BP 85, 94253 Gentilly Cedex, France). Because the last two methods (3 and 4) are designed for normal-form games rather than Bayesian games, the games were first converted using the Harsanyi transformation.

The uniform randomization method is simply choosing a uniform random policy over all possible patrol routes. This method was used as a simple baseline to measure the performance of the ASAP heuristics. It was anticipated that the uniform policy would perform reasonably well since maximum-entropy policies have been shown to be effective in multiagent security domains. The highest-reward Bayes-Nash equilibria were used in order to demonstrate the higher reward gained by looking for an optimal policy rather than an equilibria in Stackelberg games such as the modeled security domain.

Based on the experiments, three sets of graphs are presented in FIGS. 3-5 to demonstrate (1) the runtime of ASAP compared to other common methods for finding a strategy, (2) the reward guaranteed by ASAP compared to other methods, and (3) the effect of varying the parameter k, the size of the multiset, on the performance of ASAP. In the first two sets of graphs (FIGS. 3-4), the ASAP algorithm/method was run using a multiset of 80 elements; in the third set (FIG. 5) this number was varied.

The first set of graphs, shown in FIG. 3 shows a plot 300 of the runtime graphs for three-house (left column) and four-house (right column) domains. Each of the three rows of graphs corresponds to a different randomly-generated scenario. The x-axis shows the number of robber types the security agent faces and the y-axis of the graph shows the runtime in seconds. All experiments that were not concluded in 30 minutes (1800 seconds) were cut off. The runtime for the uniform policy is always negligible irrespective of the number of adversaries and hence is not shown.

The ASAP algorithm clearly outperforms the optimal, multiple-LP method as well as the MIP-Nash algorithm for finding the highest-reward Bayes-Nash equilibrium with respect to runtime. For a domain of three houses, the optimal method cannot reach a solution for more than seven robber types, and for four houses it cannot solve for more than six types within the cutoff time in any of the three scenarios. MIP-Nash solves for even fewer robber types within the cutoff time. On the other hand, ASAP runs much faster, and is able to solve for at least 20 adversaries for the three-house scenarios and for at least 12 adversaries in the four-house scenarios within the cutoff time. The runtime of ASAP does not increase strictly with the number of robber types for each scenario, but in general, the addition of more types increases the runtime required.

The second set of graphs, FIG. 4, shows a plot 400 of the reward to the patrol agent given by each method for three scenarios in the three-house (left column) and four-house (right column) domains. This reward is the utility received by the security agent in the patrolling game, and not as a percentage of the optimal reward, since it was not possible to obtain the optimal reward as the number of robber types increased. The uniform policy consistently provides the lowest reward in both domains; while the optimal method of course produces the optimal reward. The ASAP method remains consistently close to the optimal, even as the number of robber types increases. The highest-reward Bayes-Nash equilibria, provided by the MIP-Nash method, produced rewards higher than the uniform method, but lower than ASAP. This difference clearly illustrates the gains in the patrolling domain from committing to a strategy as the leader in a Stackelberg game, rather than playing a standard Bayes-Nash strategy.

The third set of graphs, shown in FIG. 5, shows a plot 500 of the effect of the multiset size on runtime in seconds (left column) and reward (right column), again expressed as the reward received by the security agent in the patrolling game, and not a percentage of the optimal reward. Results here are for the three-house domain. The trend is that as the multiset size is increased, the runtime and reward level both increase. Not surprisingly, the reward increases monotonically as the multiset size increases, but what is interesting is that there is relatively little benefit to using a large multiset in this domain. In all cases, the reward given by a multiset of 10 elements was within at least 96% of the reward given by an 80-element multiset.

With continued reference to FIG. 5, it can be seen that the runtime did not always increase strictly with the multiset size; indeed in one example (scenario 2 with 20 robber types), using a multiset of 10 elements took 1228 seconds, while using 80 elements only took 617 seconds. In general, runtime should increase since a larger multiset means a larger domain for the variables in the MILP, and thus a larger search space. However, an increase in the number of variables can sometimes allow for a policy to be constructed more quickly due to more flexibility in the problem.

Accordingly, embodiments of the present disclosure provide methods/techniques/algorithms for choosing strategies for optimized security for agents patrolling in hostile environments. In these environments, intentional threats are caused by adversaries about whom the security patrolling agents have incomplete information. Specifically, situations are dealt with where the adversaries' actions and payoffs are known but the exact adversary type is unknown to the security agent. Agents acting in the real world quite frequently have such incomplete information about other agents. Bayesian games have been a popular choice to model such incomplete information games.

Accordingly, a heuristic method, referred to as ASAP and embodiments thereof, are presented; these can provide one or more of three key advantages towards addressing problems presented by patrolling domains/situations. First, ASAP searches for the highest reward strategy, rather than a Bayes-Nash equilibrium, allowing it to find feasible strategies that exploit the natural first-mover advantage of the game. Second, it provides strategies which are simple to understand, represent, and implement. Third, it operates directly on the compact, Bayesian game representation, without requiring conversion to normal form. We provide an efficient Mixed Integer Linear Program (MILP) implementation for ASAP, along with experimental results illustrating significant speedups and higher rewards over other approaches. ASAP embodiments provide an emphasis on a highly efficient heuristic approach that is not focused on equilibrium solutions, leading to, among other things, realistically achievable and implementable patrolling solutions/strategies for large organizations, such as those running airports.

While certain embodiments have been described herein, it will be understood by one skilled in the art that the techniques (methods, systems, and/or algorithms) of the present disclosure may be embodied in other specific forms without departing from the spirit thereof.

Accordingly, the embodiments described herein, and as claimed in the attached claims, are to be considered in all respects as illustrative of the present disclosure and not restrictive.

What is claimed is:

1. A method of determining a leader's strategy for a security domain by solving a Stackelberg game, the method comprising:

fixing the policy of a leader to a k-uniform policy according to a Stackelberg game for a security domain;

formulating using a processor an optimization problem the follower solves to find its optimal response to the leader's policy;

maximizing the payoff of the leader, given that the follower uses an optimal response that is function of the leader's policy, and formulating the problem as a mixed integer quadratic program (MIQP);

performing a decomposition of the MIQP to produce a decomposed MIQP, wherein the decomposition addresses the size of the MIQP;

reformulating the leader payoff problem by linearizing the MIQP to form a decomposed mixed-integer linear program (MILP);

solving using the processor the decomposed MILP; and directing a patrolling strategy of an agent within the security domain based on the solved decomposed MILP.

2. The method of claim 1, wherein the optimization problem the follower solves is of the form, $$\sum_{j \in Q} \sum_{i \in N} \frac{1}{k} C_{ij} x_i q_j,$$

wherein the leader is the row player and the follower the column player, the vector of strategies of the leader are denoted by x, q denotes the vector of strategies of the follower, X and Q denote the index sets of the leader and follower's pure strategies, respectively, k is the size of the multiset, and the payoff matrix C correspond to $C_{ij}$ that is the reward of the follower when the leader takes pure strategy i and the follower takes pure strategy j.

3. The method of claim 2, wherein the optimization problem is subject to constraints, $$\sum_{j \in Q} q_j = 1$$

and $q \geq 0$.

4. The method of claim 2, wherein the MIQP is of the form, $$\max \sum_{i \in N} \sum_{j \in Q} \frac{1}{k} R_{ij} q(x)_j x_i,$$

and wherein the payoff matrix R corresponds to $R_{ij}$, the reward of the leader.

5. The method of claim 4, wherein the MIQP is subject to constraints, $$\sum_{i \in N} x_i = k$$

and $x_i \in \{0, 1, \ldots, k\}$.

6. The method of claim 2, wherein the MIQP is of the form, $$\max \sum_{i \in N} \sum_{j \in Q} \frac{1}{k} R_{ij} x_i q_j,$$

and wherein the payoff matrix R corresponds to $R_{ij}$, the reward of the leader.

7. The method of claim 6, wherein the MIQP is subject to constraints, $$\sum_i x_i = k,$$

$$\sum_{j \in Q} q_j = 1,$$

$$0 \leq \left( a - \sum_{i \in N} \frac{1}{k} C_{ij} x_i \right) \leq (1 - q_j) M,$$

$x_i \in \{0, 1, \ldots, k\}$, and $q_j \in \{0, 1\}$.

wherein a is the follower's maximum reward value, and M is a large constant.

8. The method of claim 1, wherein for the k-uniform policy x, the value $x_i$ is the number of times pure strategy i is used in the k-uniform policy, and wherein the k-uniform policy is selected with probability $x_i/k$.

9. The method of claim 1, further comprising performing a decomposition for multiple adversaries.

10. The method of claim 9, wherein performing a decomposition comprises constructing a decomposed MIQP of the form, $$\sum_{i \in N} \sum_{l \in L} \sum_{j \in Q} \frac{p^l}{k} R_{ij}^l x_i q_j^l.$$

11. The method of claim 10, wherein the MIQP is subject to constraints, $$\sum_i x_i = k,$$

$$\sum_{j \in Q} q_j^l = 1,$$

$$0 \leq \left( a^l - \sum_{i \in N} \frac{1}{k} C_{ij}^l x_i \right) \leq (1 - q_j^l) M,$$

$x_i \in \{0, 1, \ldots, k\}$, and $q_j^l \in \{0, 1\}$.

wherein a is the follower's maximum reward value, and M is a large constant.

12. The method of claim 9, wherein performing a decomposition comprises constructing a decomposed MILP of the form, $$\sum_{i \in N} \sum_{l \in L} \sum_{j \in Q} \frac{p^l}{k} R_{ij}^l z_{ij}^l.$$

13. The method of claim 12, wherein the MILP is subject to constraints, $$\sum_{i \in N} \sum_{j \in Q} z_{ij}^l = k,$$

$$\sum_{j \in Q} z_{ij}^l \leq k,$$

$$\sum_{j \in Q} q_j^l = 1,$$

$$0 \leq \left( a^l - \sum_{i \in N} \frac{1}{k} C_{ij}^l x_i \left( \sum_{h \in Q} z_{ih}^l \right) \right) \leq (1 - q_j^l) M,$$

$$\sum_{i \in Q} z_{ij}^l = \sum_{j \in Q} z_{ij}^l,$$

-continued $z_{ij}^l \in \{0, 1, \ldots, k\}$, and $q_j^l \in \{0, 1\}$.

wherein a is the follower's maximum reward value, and M is a large constant.

14. The method of claim 1, wherein the agent comprises a robot or an unmanned aerial vehicle (UAV).

15. The method of claim 14, wherein the security domain comprises infrastructure to be protected.

16. The method of claim 14, wherein the security domain comprises one or more airport terminals to be protected.

17. A computer-executable program product comprising a non-transitory computer-readable medium with resident computer-readable instructions, the computer readable instructions comprising instructions for:
fixing the policy of a leader to a k-uniform policy according to a Stackelberg game for a security domain;
formulating an optimization problem the follower solves to find its optimal response to the leader's policy;
maximizing the payoff of the leader, given that the follower uses an optimal response that is function of the leader's policy, and formulating the problem as a mixed integer quadratic program (MIQP);
performing a decomposition of the MIQP to produce a decomposed MIQP, wherein the decomposition addresses the size of the MIQP;
reformulating the leader payoff problem by linearizing the decomposed MIQP to form a decomposed mixed-integer linear program (MILP);
solving the decomposed MILP, wherein the leader's strategy for a security domain can be determined; and
directing a patrolling strategy of an agent within the security domain based on the solved decomposed MILP.

18. The computer-executable program product of claim 17, wherein the computer-readable instructions comprise an optimization problem the follower solves of the form, $$\sum_{j \in Q} \sum_{i \in N} \frac{1}{k} C_{ij} x_i q_j,$$

wherein the leader is the row player and the follower the column player, the vector of strategies of the leader are denoted by x, q denotes the vector of strategies of the follower, X and Q denote the index sets of the leader and follower's pure strategies, respectively, k is the size of the multiset, and the payoff matrix C correspond to $C_{ij}$ that is the reward of the follower when the leader takes pure strategy i and the follower takes pure strategy j.

19. The computer-executable program product of claim 18, wherein the computer-readable instructions including the optimization problem include constraints, $$\sum_{j \in Q} q_j = 1$$

and $q \geq 0$.

20. The computer-executable program product of claim 18, wherein for the k-uniform policy x, the value $x_i$ is the number of times pure strategy i is used in the k-uniform policy, and wherein the k-uniform policy is selected with probability $x_i/k$.

21. The computer-executable program product of claim 18, wherein the MIQP is of the form, $$\max \sum_{i \in N} \sum_{j \in Q} \frac{1}{k} R_{ij} q(x)_j x_i,$$

and wherein the payoff matrix R corresponds to $R_{ij}$, the reward of the leader.

22. The computer-executable program product of claim 21, wherein the MIQP is subject to constraints, $$\sum_{i \in N} x_i = k$$

and $x_i \in \{0, 1, \ldots, k\}$.

23. The computer-executable program product of claim 18, wherein the MIQP is of the form, $$\max \sum_{i \in N} \sum_{j \in Q} \frac{1}{k} R_{ij} x_i q_j,$$

and wherein the payoff matrix R corresponds to $R_{ij}$, the reward of the leader.

24. The computer-executable program product of claim 23, wherein the MIQP is subject to constraints, $$\sum_i x_i = k,$$

$$\sum_{j \in Q} q_j = 1,$$

$$0 \leq \left(a - \sum_{i \in N} \frac{1}{k} C_{ij} x_i\right) \leq (1 - q_j)M,$$

$x_i \in \{0, 1, \ldots, k\}$, and $q_i \in \{0, 1\}$.

wherein a is the follower's maximum reward value, and M is a large constant.

25. The computer-executable program product of claim 17, further comprising instructions for performing a decomposition for multiple adversaries.

26. The computer-executable program product of claim 25, wherein performing a decomposition comprises constructing a decomposed MIQP of the form, $$\sum_{i \in N} \sum_{l \in L} \sum_{j \in Q} \frac{p^l}{k} R_{ij}^l x_i q_j^l.$$

27. The computer-executable program product of claim 26, wherein the MIQP is subject to constraints, $$\sum_i x_i = k,$$

$$\sum_{j \in Q} q_j^l = 1,$$

-continued $$0 \le \left(a^l - \sum_{i \in N} \frac{1}{k} C_{ij}^l x_i\right) \le (1 - q_j^l)M,$$

$x_i \in \{0, 1, \ldots, k\}$, and $q_j^l \in \{0, 1\}$.

wherein a is the follower's maximum reward value, and M is a large constant.

28. The computer-executable program product of claim 25, wherein performing a decomposition comprises constructing a decomposed MILP of the form, $$\sum_{i \in N} \sum_{l \in L} \sum_{j \in Q} \frac{p^l}{k} R_{ij}^l z_{ij}^j.$$

29. The computer-executable program product of claim 28, wherein the MILP is subject to constraints, $$\sum_{i \in N} \sum_{j \in Q} z_{ij}^l = k,$$

$$\sum_{j \in Q} z_{ij}^l \le k,$$

$$\sum_{j \in Q} q_j^l = 1,$$

$$0 \le \left(a^l - \sum_{i \in N} \frac{1}{k} C_{ij}^l x_i \left(\sum_{h \in Q} z_{ih}^l\right)\right) \le (1 - q_j^l)M,$$

$$\sum_{i \in Q} z_{ij}^l = \sum_{j \in Q} z_{ij}^l,$$

$z_{ij}^l \in \{0, 1, \ldots, k\}$, and $q_j^l \in \{0, 1\}$.

wherein a is the follower's maximum reward value, and M is a large constant.

30. The computer-executable program product of claim 17, further comprising instructions for directing the patrolling of a robot or an unmanned aerial vehicle (UAV) based on the solved MILP.

31. The computer-executable program product of claim 30, wherein the patrolling domain comprises infrastructure to be protected.

32. The computer-executable program product of claim 30, wherein the patrolling domain comprises one or more airport terminals to be protected.

33. A computer system comprising:
a processor configured to:
determine a leader's strategy for a security domain by solving a Stackelberg game;
formulate a leader's a k-uniform policy according to the Stackelberg game;
formulate an optimization problem the follower solves to find its optimal response to the leader's policy;
maximize the payoff of the leader, given that the follower uses an optimal response that is function of the leader's policy, and formulating the problem as mixed integer quadratic program (MIQP);
perform a decomposition of the MIQP to produce a decomposed MIQP, wherein the decomposition addresses the size of the MIQP;
reformulate the leader payoff problem by linearizing the decomposed MIQP to form a decomposed mixed-integer linear program (MILP);
solve the decomposed MILP; and
direct a patrolling strategy of an agent within the security domain based on the solved decomposed MILP.

34. The system of claim 33, wherein the processor is configured and arranged to direct a patrolling route of a robot or an unmanned aerial vehicle (UAV).

* * * * *